(12) United States Patent
Kang et al.

(10) Patent No.: US 8,625,154 B2
(45) Date of Patent: Jan. 7, 2014

(54) APPARATUS AND METHOD FOR REPRODUCING OPTIMIZED PREFERENCE COLOR USING CANDIDATE IMAGES AND NATURAL LANGUAGES

(75) Inventors: Byoung-ho Kang, Yongin-si (KR); Se-eun Kim, Suwon-si (KR); Heui-keun Choh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1011 days.

(21) Appl. No.: 11/636,640

(22) Filed: Dec. 11, 2006

(65) Prior Publication Data

US 2007/0133024 A1  Jun. 14, 2007

(30) Foreign Application Priority Data

Dec. 9, 2005 (KR) .................. 10-2005-0120905

(51) Int. Cl.
*G06F 15/00* (2006.01)
*G06K 1/00* (2006.01)

(52) U.S. Cl.
USPC ............. 358/1.9; 358/518; 382/165; 382/276

(58) Field of Classification Search
USPC .................... 358/1.9, 518; 382/165, 276
See application file for complete search history.

(56) References Cited

U.S. PATENT DOCUMENTS

| 5,377,013 | A | * | 12/1994 | Oka et al. ...................... 358/501 |
| 5,495,539 | A | * | 2/1996 | Sieverding .................... 382/276 |
| 6,262,812 | B1 | | 7/2001 | Chan et al. |
| 2001/0035988 | A1 | * | 11/2001 | Semba et al. ................. 358/518 |
| 2002/0081024 | A1 | * | 6/2002 | Park et al. ..................... 382/165 |
| 2004/0227964 | A1 | * | 11/2004 | Fujino ........................... 358/1.9 |

FOREIGN PATENT DOCUMENTS

| JP | 11-194866 A | | 7/1999 | |
| JP | 11194866 | * | 7/1999 | ............... G06F 3/00 |
| JP | 2003-259138 A | | 9/2003 | |
| JP | 2005-085149 A | | 3/2005 | |
| KR | 10-2004-0003225 A | | 1/2004 | |

* cited by examiner

*Primary Examiner* — Twyler Haskins
*Assistant Examiner* — Michael Burleson
(74) *Attorney, Agent, or Firm* — Sughrue Mion, PLLC

(57) ABSTRACT

An apparatus and method are provided for reproducing an optimized preference color using candidate images and natural languages, in which user-oriented optimized picture quality can be provided through a printer. The apparatus includes a preference color-natural language information memory which stores characteristic information of a preference color mapped on a natural language, a candidate image provider module which provides candidate images having characteristic information applied to original images, and a candidate preference image input module which inputs one image, which satisfies a user's preference, among the candidate images.

26 Claims, 9 Drawing Sheets

| PREFERENCE COLOR | CHARACTERISTICS EXPRESSED BY NATURAL LANGUAGES | COLOR PERCEPTION | Target Coordinates (YCbCr) | | |
|---|---|---|---|---|---|
| | | | Y | Cb | Cr |
| Skin | ① Clean | Increase of Lightness Decrease of Saturation | 170.0 | 107.3 | 153.2 |
| | ② Brilliant | Increase of Lightness, Reddish | 170.0 | 115.0 | 145.0 |
| | ③ Bright | Dark Region, Increase of Lightness | 160.0 | 115.0 | 150.0 |
| | ④ Mild | Yellowish | 175.0 | 110.0 | 153.0 |
| | ⑤ Healthy | Reddish | 180.0 | 110.0 | 150.0 |
| Sky | ① Bright | Increase of Lightness | 185.0 | 125.0 | 125.0 |
| | ② Clear | Decrease of Lightness | 150.0 | 168.0 | 98.0 |
| | ③ Limpid | Blue -> Cyan | 140.0 | 170.0 | 70.0 |
| | ④ Deep-blue | Cyan -> Blue | 50.0 | 185.0 | 85.0 |
| | ⑤ Purplish | Purplish | 90.0 | 190.0 | 80.0 |
| Grass | ① Bright | Increase of Lightness, Decrease of Shadow | 60.0 | 110.0 | 115.0 |
| | ② Deep-blue | Bluish | 130.0 | 103.0 | 106.0 |
| | ③ Light | Yellowish | 90.0 | 90.0 | 110.0 |
| | ④ Vivid | Increase of Saturation | 85.0 | 103.0 | 95.0 |
| | ⑤ Natural | Increase of Lightness | 90.0 | 90.0 | 90.0 |

FIG. 8

| PREFERENCE COLOR | CHARACTERISTICS EXPRESSED BY NATURAL LANGUAGES | COLOR PERCEPTION | Target Coordinates (YCbCr) | | |
|---|---|---|---|---|---|
| | | | Y | Cb | Cr |
| Skin | ① Clean | Increase of Lightness Decrease of Saturation | 170.0 | 107.3 | 153.2 |
| | ② Brilliant | Increase of Lightness, Reddish | 170.0 | 115.0 | 145.0 |
| | ③ Bright | Dark Region, Increase of Lightness | 160.0 | 115.0 | 150.0 |
| | ④ Mild | Yellowish | 175.0 | 110.0 | 153.0 |
| | ⑤ Healthy | Reddish | 180.0 | 110.0 | 150.0 |
| Sky | ① Bright | Increase of Lightness | 185.0 | 125.0 | 125.0 |
| | ② Clear | Decrease of Lightness | 150.0 | 168.0 | 99.0 |
| | ③ Limpid | Blue -> Cyan | 140.0 | 170.0 | 70.0 |
| | ④ Deep-blue | Cyan -> Blue | 50.0 | 185.0 | 85.0 |
| | ⑤ Purplish | Purplish | 90.0 | 190.0 | 80.0 |
| Grass | ① Bright | Increase of Lightness, Decrease of Shadow | 60.0 | 110.0 | 115.0 |
| | ② Deep-blue | Bluish | 130.0 | 103.0 | 106.0 |
| | ③ Light | Yellowish | 90.0 | 90.0 | 110.0 |
| | ④ Vivid | Increase of Saturation | 85.0 | 103.0 | 95.0 |
| | ⑤ Natural | Increase of Lightness | 90.0 | 90.0 | 90.0 |

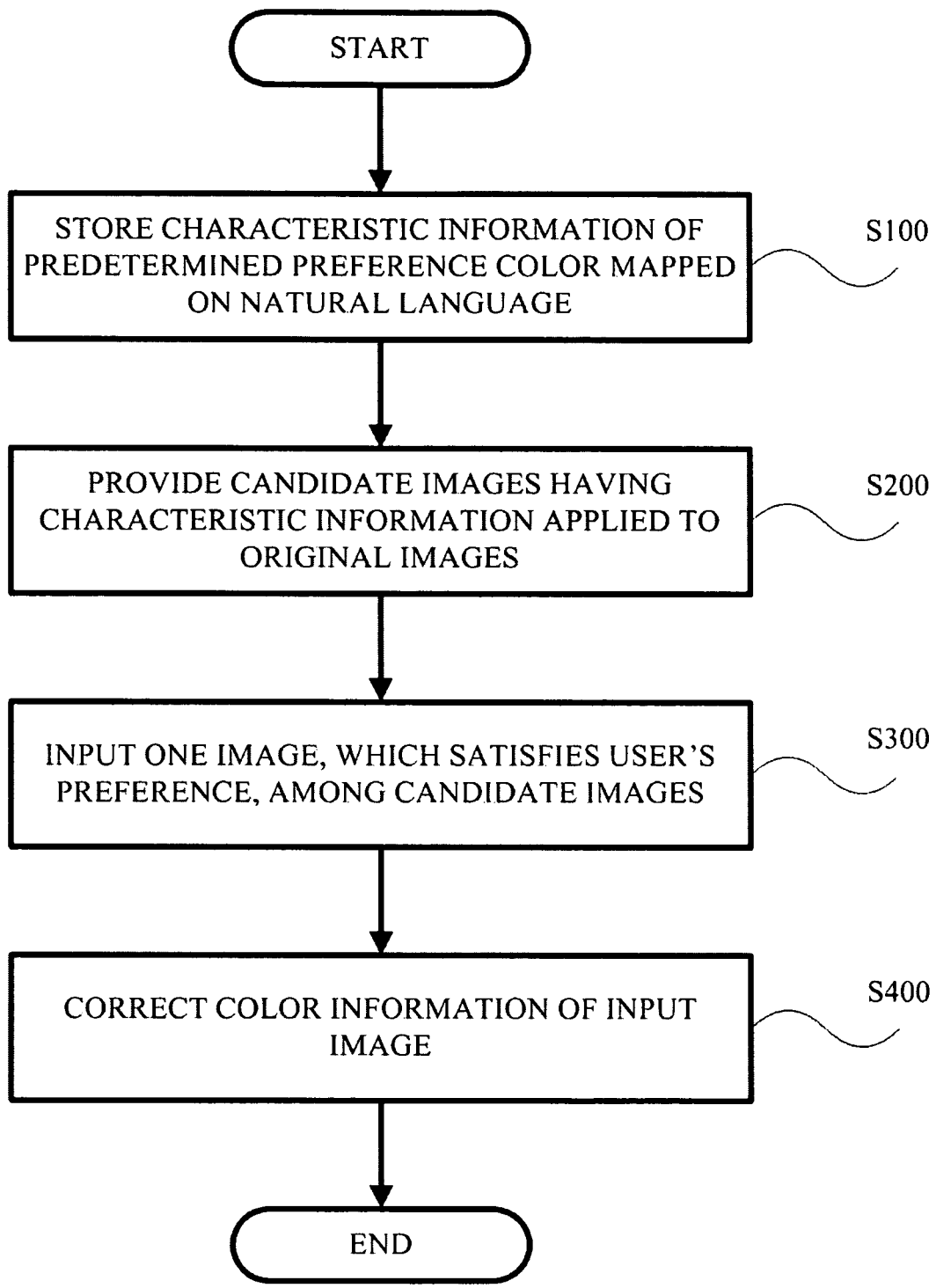

APPARATUS AND METHOD FOR REPRODUCING OPTIMIZED PREFERENCE COLOR USING CANDIDATE IMAGES AND NATURAL LANGUAGES

CROSS-REFERENCE TO RELATED APPLICATION

This application is based on and claims priority from Korean Patent Application No. 10-2005-0120905, filed on Dec. 9, 2005 in the Korean Intellectual Property Office, the disclosure of which is incorporated herein in its entirety by reference.

BACKGROUND OF THE INVENTION

1. Field of the Invention

Apparatuses and methods consistent with the present invention relate to reproducing an optimized preference color using candidate images and natural languages and, more particularly, reproducing an optimized preference color using candidate images and natural languages, in which characteristic information of a preference color mapped on a natural language is applied to an original image to provide candidate images, a preference image among the candidate images is inputted, and color information of the input preference image can be corrected.

2. Description of the Related Art

Digital imaging devices, which reproduce colors, such as monitors, scanners, and printers, have various functions and high quality to fulfill users' various demands. Also, the digital imaging devices use different color spaces or different color models depending on their respective fields of use. Examples of the color models include a device dependent color model and a device independent color model. The device dependent color model includes an RGB color model corresponding to an additive color space model, and a CMYK color model corresponding to a subtractive color space model. The device independent color model includes a CIE L*a*b* model, a CIE XYZ model, and a CIE LUV model. The CMYK color model is used in the field of printing, while the RGB color model is used in the field of computer monitors, such as Internet graphics.

When a user views images from a printer that outputs digital video images or a display device that displays images, a color, which stimulates a user's visual perception and is preferred by the user in a color gamut is referred to as a preference color. The preference color affects the performance of an output device such as a printer. To allow a user to obtain a preference color, related art techniques for reproducing and converting a preference color have been discussed. Examples of such related art techniques include a technique for automatically converting a color gamut of flesh-color or sky-blue using a previously defined matrix, and a technique for automatically converting a skin color to a previously defined preference color.

However, such related art techniques have a problem in that they do not allow a user to execute image conversion by previously providing a preference image or to correct a converted image.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and method for reproducing an optimized preference color using candidate images and natural languages, in which characteristic information of a preference color mapped on a natural language is applied to an original image to provide candidate images, a preference image among the candidate images is inputted, and color information of the input preference image can be corrected.

The present invention also provides an apparatus and method for generating characteristic information of a preference color, which generates characteristic information for reproducing a preference color that corresponds to the preference color, characteristics of the preference color expressed by natural languages, and target coordinates corresponding to the characteristics.

According to an aspect of the present invention, there is provided an apparatus for reproducing an optimized preference color using candidate images and natural languages, which includes a preference color-natural language information memory which stores characteristic information of a predetermined preference color mapped on a natural language, a candidate image provider module which provides candidate images having characteristic information applied to original images, and a candidate preference image input module which inputs one image, which satisfies a user's preference, among the candidate images.

In another aspect of the present invention, there is provided an apparatus for generating characteristic information of a preference color, which includes a preference color selection module which selects one preference color of skin, sky-blue, and green grass, a characteristic selection module which selects one of a plurality of characteristics of the selected preference color expressed by natural languages, a target coordinate calculation module which calculates target coordinates corresponding to the selected characteristic, and a characteristic information generation module which generates characteristic information for reproducing the preference color, corresponding to the preference color, the characteristic, and the target coordinates.

In still another aspect of the present invention, there is provided a method of reproducing an optimized preference color using candidate images and natural languages, which includes storing characteristic information of a predetermined preference color mapped on a natural language, providing candidate images having characteristic information applied to original images, and inputting one image, which satisfies a user's preference, among the candidate images.

In further still another aspect of the present invention, there is provided a method of generating characteristic information of a preference color, which includes selecting one preference color of skin, sky-blue, and green grass, selecting one of a plurality of characteristics of the selected preference color expressed by natural languages, calculating target coordinates corresponding to the selected characteristic, and generating characteristic information for reproducing the preference color, corresponding to the preference color, the characteristic, and the target coordinates.

BRIEF DESCRIPTION OF THE DRAWINGS

The above and other aspects of the present invention will become more apparent from the following detailed description of exemplary embodiments taken in conjunction with the accompanying drawings, in which:

FIG. 8 is a table illustrating preference colors, characteristics of preference colors, and target coordinates;

FIG. 9 is a flowchart illustrating a method of reproducing an optimized preference color using candidate images and natural images in accordance with an exemplary embodiment of the present invention.

DETAILED DESCRIPTION OF EXEMPLARY EMBODIMENTS OF THE INVENTION

Figure 1:
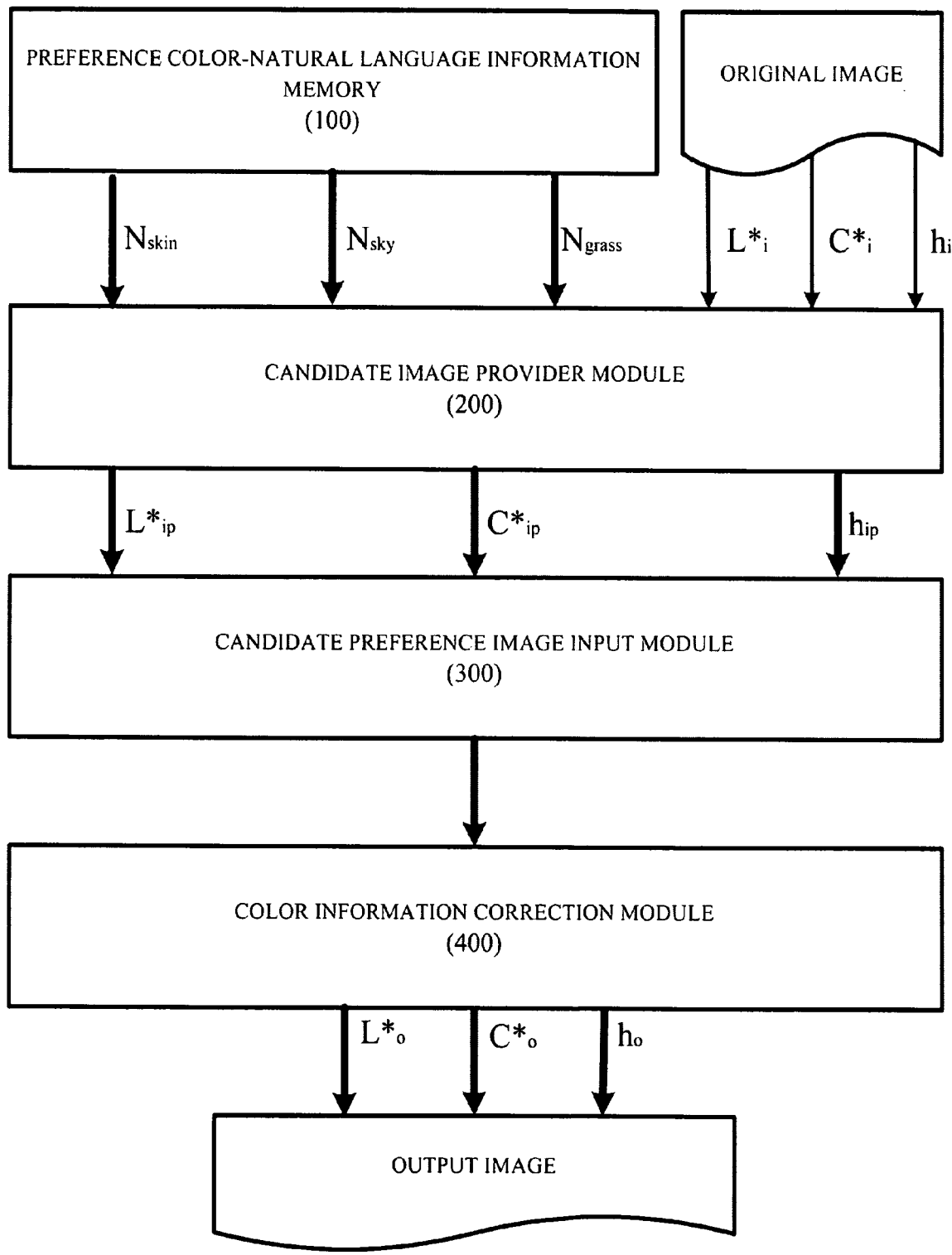
FIG. 1 is a view illustrating the whole configuration of an apparatus for reproducing an optimized preference color using candidate images and natural languages in accordance with an exemplary embodiment of the present invention.

Hereinafter, exemplary embodiments of the present invention will be described in detail with reference to the accompanying drawings. The aspects and features of the present invention and methods for achieving the aspects and features will be apparent by referring to exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are provided to assist those of ordinary skill in the art in a comprehensive understanding of the invention, and the present invention is only defined within the scope of the appended claims and their legal equivalents. In the entire description of the present invention, the same drawing reference numerals are used for the same elements across various figures.

FIG. 1 is a view illustrating the whole configuration of an apparatus for reproducing an optimized preference color using candidate images and natural languages in accordance with an exemplary embodiment of the present invention. Referring to FIG. 1, the apparatus for reproducing an optimized preference color using candidate images and natural languages includes a preference color-natural language information memory 100, a candidate image provider module 200, a candidate preference image input module 300, and a color information correction module 400.

The preference color-natural language information memory 100 stores characteristic information of a predetermined preference color mapped on a natural language, wherein the preference color effectively responds to a user's perception and includes a skin color, a sky-blue color, and a green grass color. The preference color greatly affects the picture quality of a printed image. In FIG. 1, $N_{skin}$ is a natural expression of characteristics of a skin color, $N_{sky}$ is a natural expression of characteristics of a sky-blue color, and $N_{grass}$ is a natural expression of characteristics of a green grass color. Meanwhile, for original images expressed in FIG. 1, lightness showing brightness of color is expressed as $L_i^*$, chroma or saturation showing definition of color is expressed as $C_i^*$, and hue showing name of color is expressed as $h_i$.

The candidate image provider module 200 is provided with characteristic information from the preference color-natural language information memory 100, wherein the characteristic information is mapped on natural languages $N_{skin}$, $N_{sky}$, and $N_{grass}$. The candidate image provider module 200 is also provided with the original images of $L_i^*$, $C_i^*$ and $h_i$. Thus, the candidate image provider module 200 serves to provide candidate images obtained by applying the characteristic information to the original images. Since lightness $L_i^*$, chroma $C_i^*$, and hue $h_i$ of the original images are controlled through processing steps by the candidate image provider module 200, $L_i^*$ is expressed as $L_{ip}^*$, $C_i^*$ is expressed as $C_{ip}^*$, and $h_i$ is expressed as $h_{ip}$.

If the user selects one candidate image, which satisfies its preference, among the candidate images provided from the candidate image provider module 200, the candidate preference image input module 300 inputs the selected image. Finally, the color information correction module 400 corrects the color information of the input image to display an output image. In this case, it is noted that lightness, chroma and hue of the output image are respectively expressed as $L_o^*$, $C_o^*$ and $h_o$.

The characteristic information used in FIG. 1 includes the preference color, a plurality of characteristics of the preference color expressed by natural languages, and target coordinates corresponding to the plurality of characteristics. The characteristic information is used in a broader range than "characteristic."

Hereinafter, the apparatus for reproducing an optimized preference color using candidate images and natural languages in accordance with an exemplary embodiment of the present invention will be described in more detail with reference to FIGS. 2-6.

Figure 2:
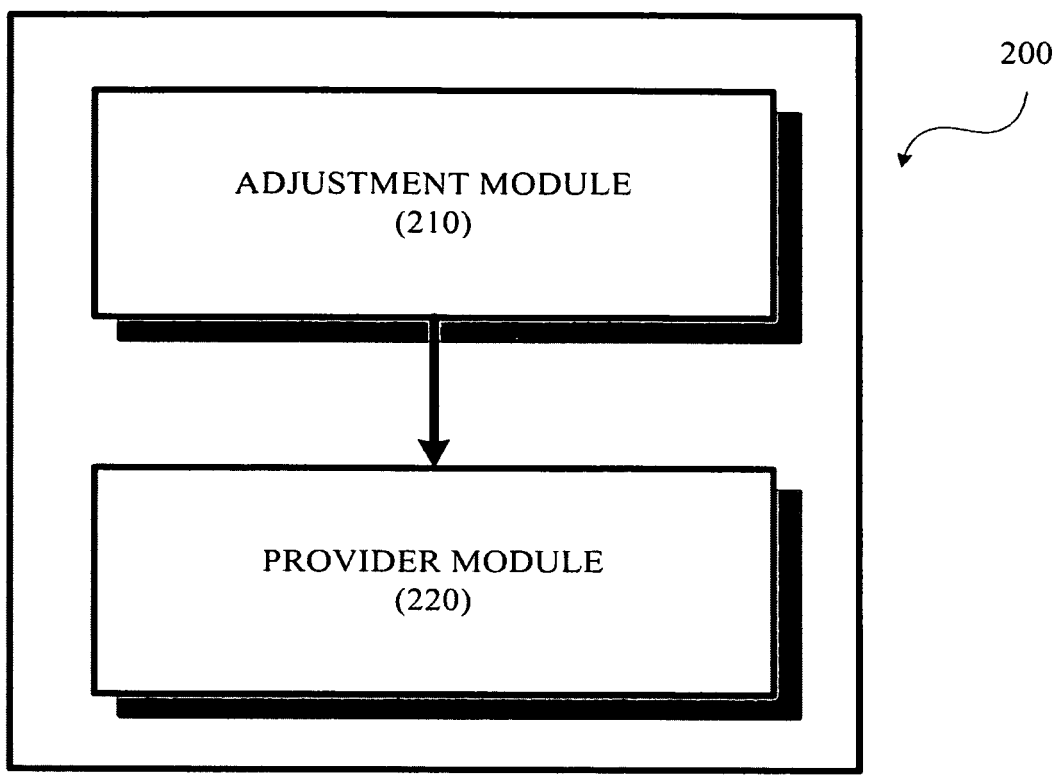
FIG. 2 is a view illustrating the construction of a candidate image provider module of FIG. 1.

FIG. 2 is a view illustrating the construction of the candidate image provider module 200 of FIG. 1. The candidate image provider module 200 includes an adjustment module 210 and a provider module 220.

Figure 3:
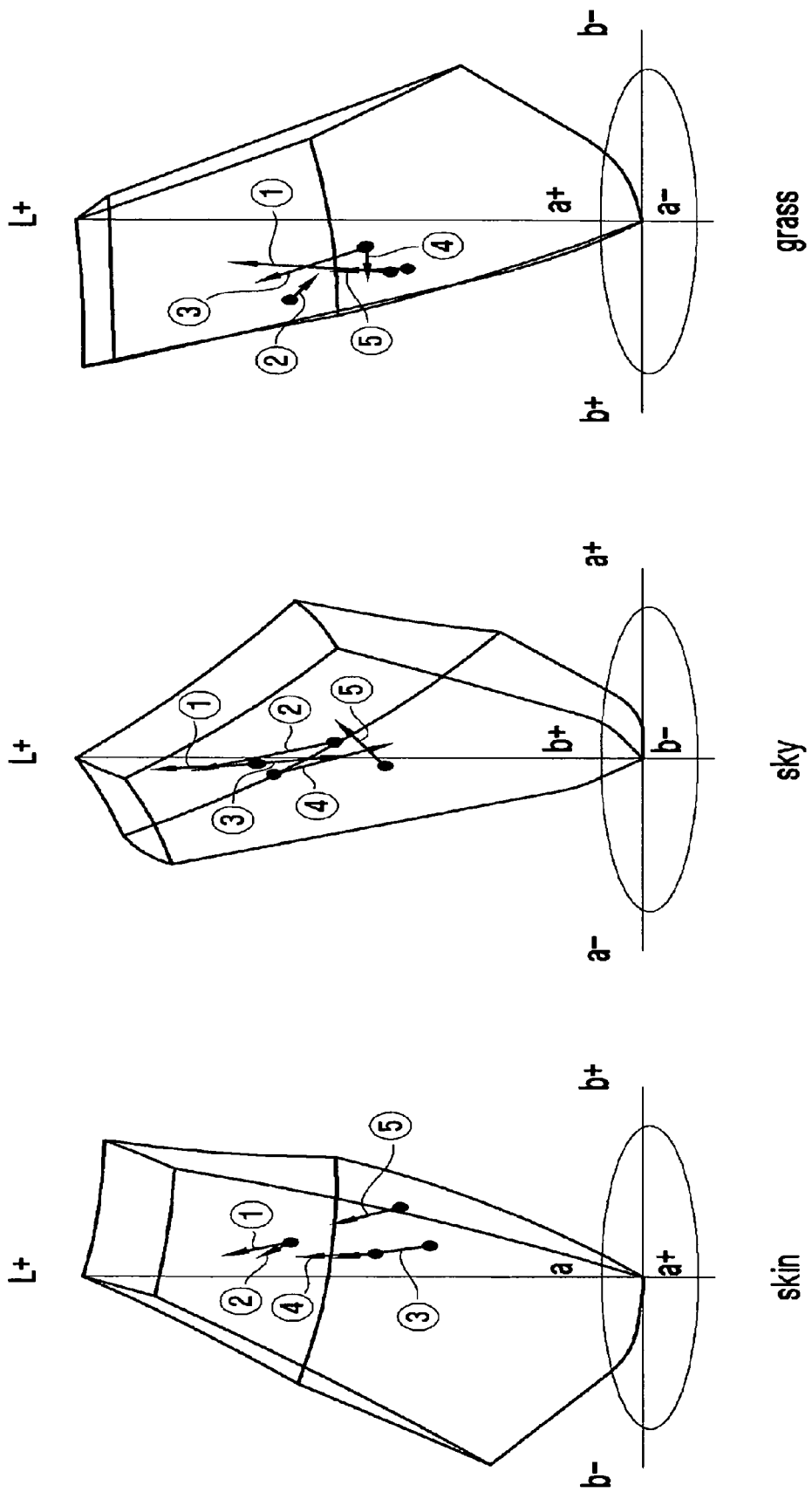
FIG. 3 is a view illustrating a process of adjusting a preference color to target coordinates using an image conversion function.

As shown in FIG. 3, the adjustment module 210 adjusts the preference colors constituting the original images to colors corresponding to the target coordinates using a predetermined image conversion function. FIG. 3 is a view illustrating a process of adjusting the preference colors to the target coordinates by using the image conversion function.

FIG. 3 shows an L*a*b* color space of a CIE color model decided by the International Commission on Illumination (ICI), which decides the standard of lighting apparatuses. The adjustment module 210 reflects five kinds of characteristics selected by the user in the skin color, the sky-blue color, and the green grass color to move the colors to the target coordinates ① to ⑤ corresponding to the respective characteristics. In FIG. 3, the numbers ① to ⑤ correspond to five kinds of characteristics in a table as shown in FIG. 8.

Figure 4:
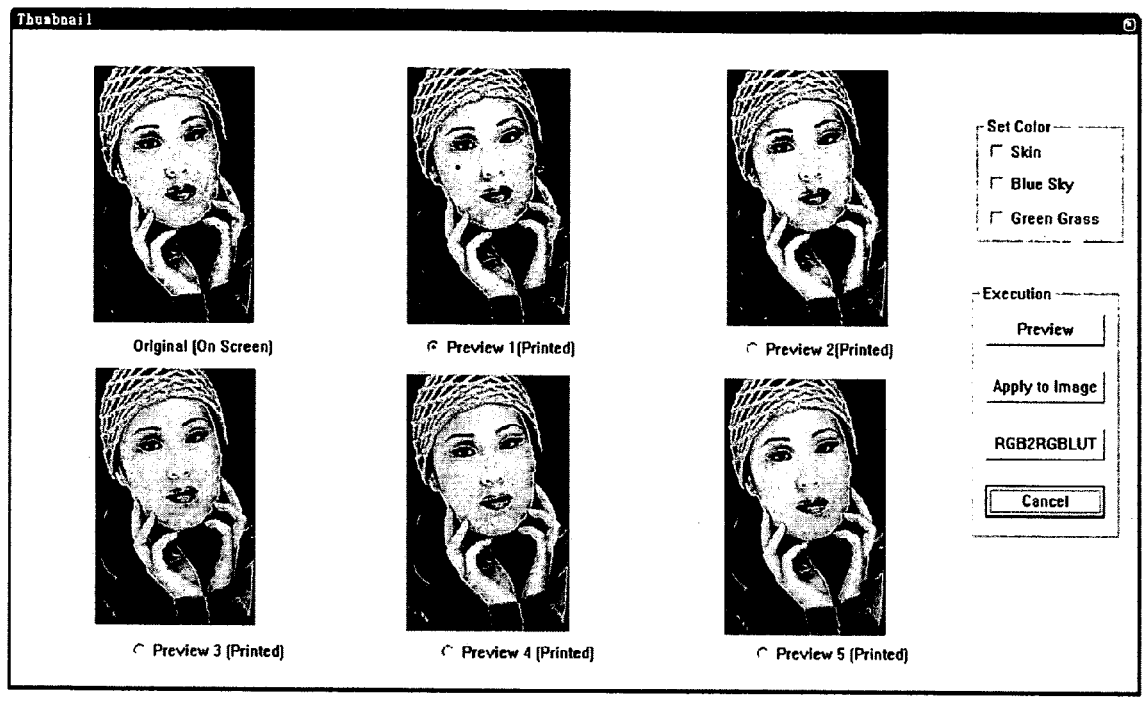
FIG. 4 is a view illustrating a graphic user interface that provides an original image and a plurality of candidate images having characteristic information.

The provider module 220 provides the plurality of candidate images comprised of the preference colors such as skin, sky-blue and grass, moved for adjustment to the target coordinates ① to ⑤ corresponding to the respective characteristics. The provider module 220 can provide the plurality of candidate images using soft-proofing. Soft-proofing uses software to simulate a printed result in a display device. This is shown in FIG. 4 which is a view illustrating a graphic user interface that provides the plurality of candidate images and the original image having the characteristic information. Referring to FIG. 4, an upper image at the left is the original image, and images corresponding to Preview 1 through Preview 5 allow the user to preview the results adjusted to the target coordinates corresponding to the five kinds of characteristics of the skin color, i.e., ① "clean", ② "brilliant", ③ "bright", ④ "mild", and ⑤ "healthy." A "Set Color" box of an upper right-hand side in FIG. 4 displays an interface for selecting one preference color among three kinds of preference colors, such as skin, sky-blue and green grass. An "Execution" box of a lower right-hand side in FIG. 4 includes a "Preview" button, an "Apply to Image" button that allows a selected characteristic to be applied to the original image, a "RGB2RGBLUT" button that allows conversion of RGB information, and a "Cancel" button that allows cancellation of execution.

The user can select one image, which satisfies its preference, among the plurality of candidate images to which the respective characteristics are applied by the interface, as illustrated in FIG. 4.

Figure 5:
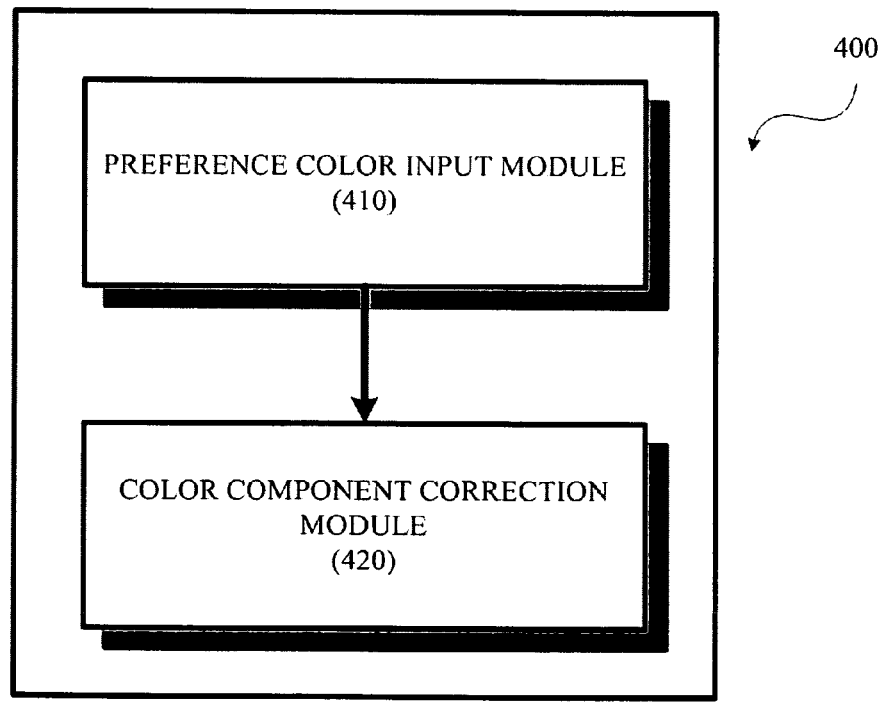
FIG. 5 is a view illustrating the construction of a color information correction module of FIG. 1.

FIG. 5 is a view illustrating the construction of the color information correction module 400 of FIG. 1. The color information correction module 400 corrects color information of the input image to display an output image. The color information correction module 400 includes a preference color input module 410 and a color component correction module 420.

The preference color input module 410 inputs a target preference color to be corrected, among preference colors constituting the input image. The color component correction module 420 corrects a color component of the input preference color and displays an image of the corrected result using soft-proofing. Preferably, but not necessarily, the color component includes color information, such as lightness, chroma and hue, accustomed to general users.

Figure 6:
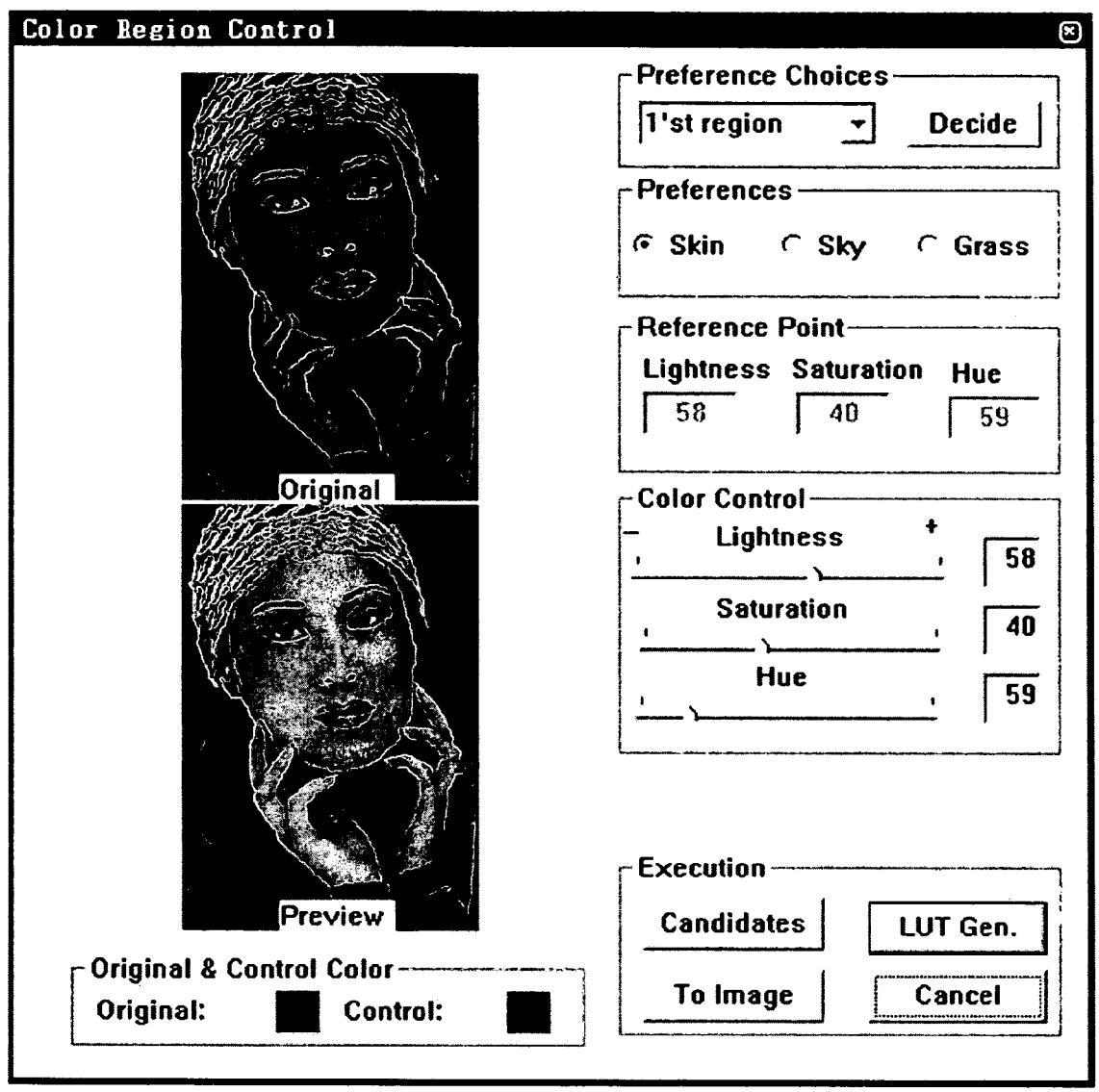
FIG. 6 is a view illustrating a graphic user interface that corrects color information.

The process of selecting the preference color to be corrected and correcting the color component of the selected preference color is shown in FIG. 6. FIG. 6 is a view illustrating a graphic user interface that corrects the color information. Referring to FIG. 6, an image of an upper left-hand side is the image (having the characteristic information) inputted by the candidate preference image input module 300, and an image of a lower left-hand side is a preview image after being corrected by the color information correction module 400. An upper right-hand side in FIG. 6 displays a "Preference Choices" box that allows the user to select a region to be corrected, and a "Preferences" box that allows the preference color input module 410 to input the preference color. It is noted from FIG. 6 that "skin" is marked to correct the skin color. A portion for correcting the color component is displayed in the "Reference Point" box below the "Preferences" box, wherein the user can input numerical values of lightness, saturation and hue to designate correction values. It is noted from FIG. 6 that the color component is corrected in the range of lightness of 58, saturation of 40, and hue of 59. Then, a "Color Control" interface allows the user to again adjust lightness, saturation and hue using an adjustment slider. An "Execution" interface of the lower right-hand corner includes a "Candidates" button that allows the user to again select the candidate image, an "LUT Gen." button that allows a look-up table of lightness, saturation and hue to be displayed, a "To Image" button that displays a correction image, and a "Cancel" button that allows cancellation of execution. Also, an "Original & Control Color" interface of the lower left-hand corner displays a color of the original image and a color of the corrected image to allow the user to identify the two colors at a glance.

Hereinafter, an apparatus for generating characteristic information, which is required to carry out the aforementioned apparatus of the present invention, will be described with reference to FIG. 7 and FIG. 8.

Figure 7:
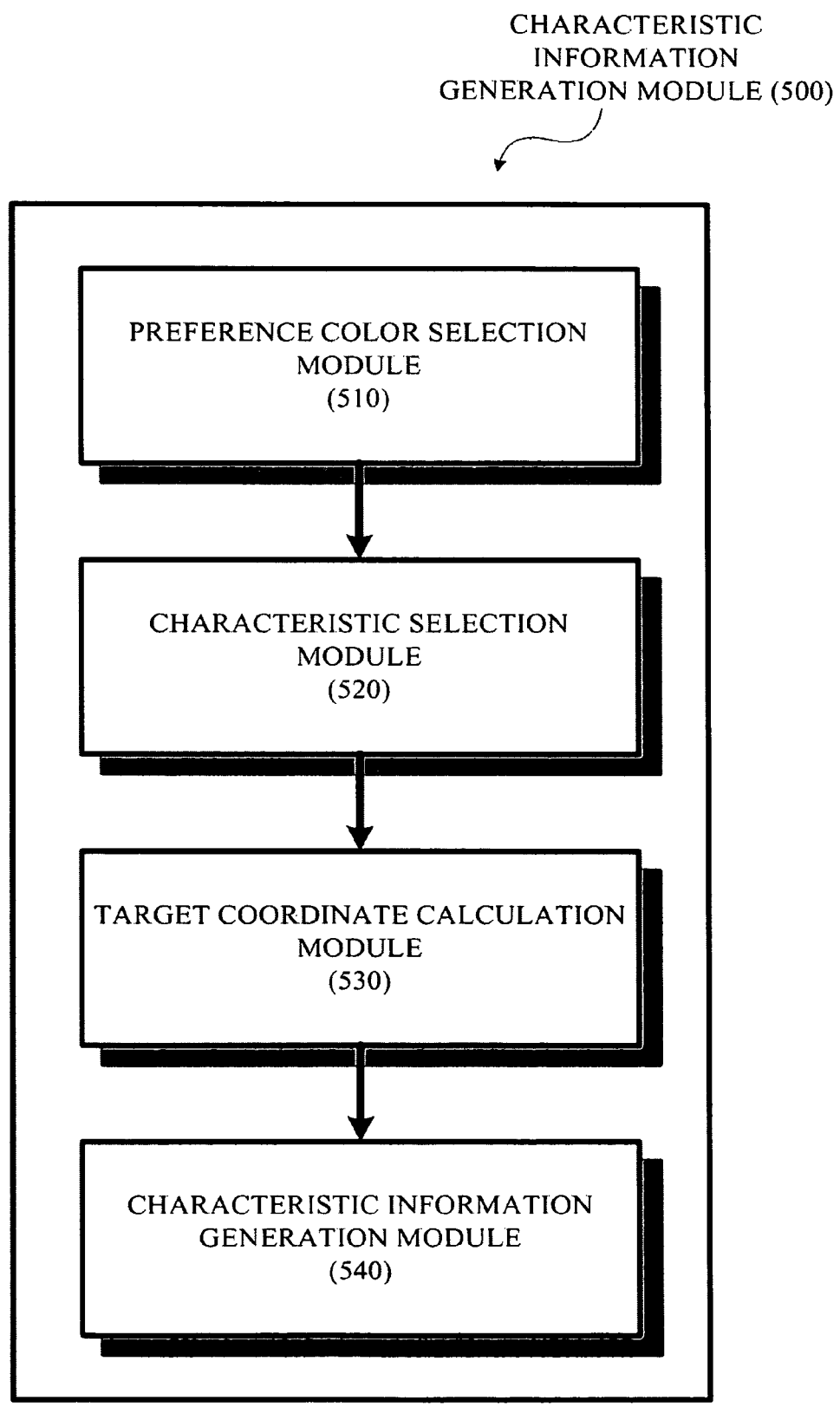
FIG. 7 is a view illustrating the construction of an apparatus for generating characteristic information for a preference color in accordance with an exemplary embodiment of the present invention.

FIG. 7 is a view illustrating the construction of an apparatus for generating characteristic information of a preference color in accordance with an exemplary embodiment of the present invention, and FIG. 8 is a table illustrating preference colors, characteristics of the preference colors, and target coordinates. Referring to FIG. 7, the apparatus 500 for generating characteristic information of the preference color includes a preference color selection module 510, a characteristic selection module 520, a target coordinate calculation module 530, and a characteristic information generation module 540.

The preference color selection module 510 selects one of preference colors, such as skin, sky-blue, and green glass, which constitute an image to be converted.

The characteristic selection module 520 allows the user to select characteristics to be converted for the selected preference color. In other words, the characteristic selection module 520 selects one of a plurality of characteristics expressed by natural languages for the selected preference color.

The target coordinate calculation module 530 calculates target coordinates corresponding to the selected characteristic.

The characteristic information generation module 540 generates characteristic information for reproducing a preference color, corresponding to the preference color, the characteristic and the target coordinates.

It is noted that characteristics of each preference color expressed by natural languages and YCbCr values of target coordinates corresponding to the characteristics are exemplarily shown in FIG. 8. Referring to FIG. 8, characteristics of skin, sky-blue and green grass expressed by five kinds of natural language interfaces are shown. The user can select five kinds of characteristics of the skin color, such as ① "clean", ② "brilliant", ③ "bright", ④ "mild", and ⑤ "healthy," and five kinds of characteristics of the sky-blue color, such as ① "bright", ② "clear", ③ "limpid", ④ "deep blue", and ⑤ "purplish." Likewise, the user can select five kinds of characteristics of the green grass color, such as ① "bright", ② "deep blue", ③ "light", ④ "vivid", and ⑤ "natural." Color perception of the table of FIG. 8 describes the concept of each characteristic. For example, the characteristic ① "clean" of the skin color increases lightness and decreases saturation, the characteristic ① "bright" of the sky-blue color increases lightness, and the characteristic ① "bright" of the green grass color increases lightness and decreases shadow. It is noted from the right of the table of FIG. 8 that YCbCr values of the target coordinates corresponding to the characteristics are calculated and mapped.

In exemplary embodiments of the present invention, the term "unit", that is, "module" or "table", as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented so as to execute one or more CPUs in a device.

A method of reproducing an optimized preference color will now be described with reference to FIG. 9. In particular, FIG. 9 is a flowchart illustrating a method of reproducing an optimized preference color using candidate images and natural images in accordance with an exemplary embodiment of the present invention.

First, the preference color-natural language information memory 100 stores characteristic information of a predetermined preference color mapped on a natural language (S100). The preference color greatly affects the picture quality of a printed image and effectively responds to the user's perception. Examples of the preference color include skin, sky-blue, and green grass. The characteristic information includes the preference color, a plurality of characteristics of the preference color expressed by natural languages, and target coordinates corresponding to the plurality of characteristics. The characteristic information is used in a broader range than "characteristic."

The candidate image provider module 200 provides candidate images obtained by applying the characteristics information to the original images (S200). In more detail, operation S200 includes adjusting the preference colors constituting the original images to colors corresponding to the target coordinates using an image conversion function and providing the plurality of candidate images of the adjusted preference colors. The candidate image provider module 200 can provide the candidate images using soft-proofing.

The candidate preference image input module 300 inputs one image, which satisfies the user's preference, among the candidate images (S300).

Additionally, the color information correction module 400 can correct color information of the input image (S400). In more detail, the operation 400 includes inputting the preference color to be corrected among the preference colors constituting the input image, and correcting the color component of the input preference color. The operation of correcting the color component of the input preference color can include displaying the image of the corrected result of the color component using soft-proofing. Preferably, but not necessarily, the color component includes color information, such as lightness, chroma and hue, accustomed to general users.

Figure 10:
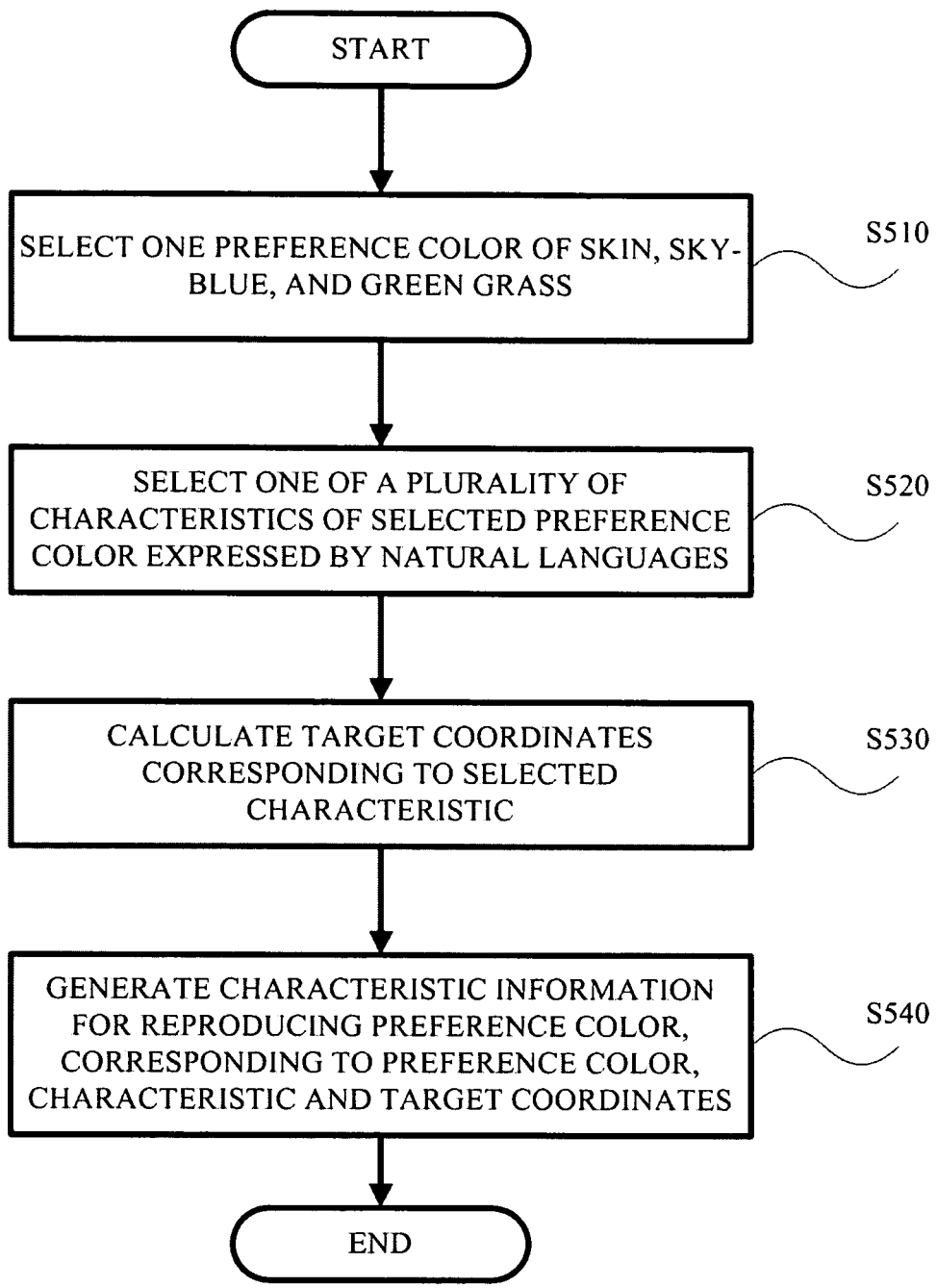
FIG. 10 is a flowchart illustrating a method of generating characteristic information of a preference color in accordance with an exemplary embodiment of the present invention.

FIG. 10 is a flowchart illustrating a method of generating the characteristic information of the preference color in accordance with an exemplary embodiment of the present invention.

Referring to FIG. 10, the preference color selection module 510 selects one of the preference colors such as skin, sky-blue and green grass (S510). The characteristic selection module 520 selects one of a plurality of characteristics of the selected preference color expressed by natural languages (S500). The target coordinate calculation module 530 calculates the target coordinates corresponding to the selected characteristic (S530). Finally, the characteristic information generation module 540 generates characteristic information for reproducing the preference color, corresponding to the preference color, the characteristic and the target coordinates (S540).

Meanwhile, it is apparent to those skilled in the art that the scope of the apparatus for reproducing an optimized preference color using candidate images and natural languages according to exemplary embodiments of the present invention is extended to a computer programmable recording medium that can record the aforementioned method using a computer.

As described above, the apparatus and method for reproducing an optimized preference color using candidate images and natural languages according to the exemplary embodiments of the present invention have the following advantages.

The characteristic information of the preference color mapped on the natural language is applied to the original images to provide the candidate images, and a preference of one of the candidate images is inputted, and color information of the input image can be corrected.

Also, in the apparatus and method for generating characteristic information of a preference color, the preference color, characteristics of the preference color expressed by the natural languages, and the target coordinates corresponding to the characteristics correspond to characteristic information for reproducing the preference color.

Accordingly, it is possible to provide user-oriented optimized picture quality through a printer to which exemplary embodiments of the present invention are applied.

The exemplary embodiments of the present invention have been described for illustrative purposes, and those skilled in the art will appreciate that various modifications, additions and substitutions are possible without departing from the scope and spirit of the invention as disclosed in the accompanying claims. Therefore, the scope of the present invention should be defined by the appended claims and their legal equivalents.

What is claimed is:

1. An apparatus for reproducing an optimized preference color using candidate images and natural language, the apparatus comprising:
   a preference color-natural language information memory which stores characteristic information of a preference color mapped on a natural language;
   a candidate image provider module which provides a plurality of candidate images obtained by applying the characteristic information to an original image; and
   a candidate preference image input module which inputs one image, which satisfies a user's preference, among the plurality of candidate images,
   wherein the characteristic information includes the preference color, and a plurality of characteristics expressed by the natural language for the preference color.

2. The apparatus of claim 1, further comprising a color information correction module which corrects color information of the input image.

3. The apparatus of claim 2, wherein the color information correction module comprises:
   a preference color input module which inputs a preference color to be corrected among preference colors constituting the input image; and
   a color component correction module which corrects a color component of the input preference color.

4. The apparatus of claim 3, wherein the color component correction module displays an image of the corrected result of the color component using soft-proofing.

5. The apparatus of claim 3, wherein the color component is one of lightness, chroma, and hue.

6. The apparatus of claim 1, wherein the preference color is one of skin, blue and green.

7. The apparatus of claim 6, wherein the plurality of characteristics expressed by the natural language for the skin preference color comprises one of clean, brilliant, bright, mild and healthy.

8. The apparatus of claim 6, wherein the plurality of characteristics expressed by the natural language for the blue preference color comprises one of bright, clear, limpid, deep-blue and purplish.

9. The apparatus of claim 6, wherein the plurality of characteristics expressed by the natural language for the green preference color comprises one of bright, deep-blue, light, vivid and natural.

10. The apparatus of claim 1, wherein the characteristic information further includes target coordinates corresponding to the plurality of characteristics.

11. The apparatus of claim 10, wherein the candidate image provider module comprises:
an adjustment module which adjusts preference colors constituting original images to colors corresponding to the target coordinates using an image conversion function; and
a provider module which provides the plurality of candidate images comprised of the adjusted preference colors.

12. The apparatus of claim 11, wherein the provider module provides the plurality of candidate images using soft-proofing.

13. The apparatus of claim 1, wherein the plurality of candidate images are displayed on a screen for preview by the user.

14. The apparatus of claim 13, wherein the plurality of candidate images are displayed on the screen at same time.

15. The apparatus of claim 1, wherein each of the plurality of candidate images are obtained at same time.

16. The apparatus of claim 1, wherein the applying of the characteristic information to the original image is based on the preference color selected by the user from a plurality of preference color expressed in the natural language, and
wherein each of the plurality of preference color includes the plurality of characteristics expressed by the natural language.

17. A method of reproducing an optimized preference color using candidate images and natural language, the method comprising:
storing characteristic information of a preference color mapped on a natural language;
providing a plurality of candidate images obtained by applying the characteristic information to an original image; and
inputting one image, which satisfies a user's preference, among the plurality of candidate images,
wherein the characteristic information includes the preference color, and a plurality of characteristics expressed by the natural language for the preference color.

18. The method of claim 17, further comprising correcting color information of the input image.

19. The method of claim 18, wherein correcting the color information comprises: inputting a preference color to be corrected among preference colors constituting the input image; and correcting a color component of the input preference color.

20. The method of claim 19, wherein correcting the color component comprises displaying an image of the corrected result of the color component using soft-proofing.

21. The method of claim 19, wherein the color component is one of lightness, chroma, and hue.

22. The method of claim 17, wherein the preference color is one of skin, blue and green.

23. The apparatus of claim 17, wherein the characteristic information further includes target coordinates corresponding to the plurality of characteristics.

24. The method of claim 23, wherein providing the candidate images comprises:
adjusting preference colors constituting original images to colors corresponding to the target coordinates using an image conversion function; and
providing the plurality of candidate images, which comprise the adjusted preference colors.

25. The method of claim 24, wherein providing the plurality of candidate images further comprises using soft-proofing.

26. A computer-readable recording medium recorded with a program code for a computer to execute a method of reproducing an optimized preference color using candidate images and natural language, the method comprising:
storing characteristic information of a preference color mapped on a natural language;
providing a plurality of candidate images obtained by applying the characteristic information to an original image; and
inputting one image, which satisfies a user's preference, among the plurality of candidate images,
wherein the characteristic information includes the preference color, and a plurality of characteristics expressed by the natural language for the preference color.

* * * * *